United States Patent
Legrand et al.

(10) Patent No.: US 12,018,147 B2
(45) Date of Patent: Jun. 25, 2024

(54) METHOD FOR MANUFACTURING AN INSULATION PRODUCT BASED ON MINERAL WOOL

(71) Applicant: SAINT-GOBAIN ISOVER, Courbevoie (FR)

(72) Inventors: Aurélie Legrand, Paris (FR); Edouard Obert, Fleurines (FR); Delphine Toulemon, Vineuil-Saint-Firmin (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 527 days.

(21) Appl. No.: 17/419,357

(22) PCT Filed: Jan. 8, 2020

(86) PCT No.: PCT/FR2020/050026
§ 371 (c)(1),
(2) Date: Jun. 29, 2021

(87) PCT Pub. No.: WO2020/144436
PCT Pub. Date: Jul. 16, 2020

(65) Prior Publication Data
US 2022/0081553 A1    Mar. 17, 2022

(30) Foreign Application Priority Data
Jan. 11, 2019  (FR) .................................... 1900256

(51) Int. Cl.
| | | |
|---|---|---|
| *C08L 67/04* | (2006.01) | |
| *C03C 25/1095* | (2018.01) | |
| *C03C 25/321* | (2018.01) | |
| *C09J 105/00* | (2006.01) | |
| *D04H 1/4209* | (2012.01) | |
| *D04H 1/4218* | (2012.01) | |
| *D04H 1/587* | (2012.01) | |
| *D04H 1/64* | (2012.01) | |

(52) U.S. Cl.
CPC .......... *C08L 67/04* (2013.01); *C03C 25/1095* (2013.01); *C03C 25/321* (2013.01); *C09J 105/00* (2013.01); *D04H 1/4209* (2013.01); *D04H 1/4218* (2013.01); *D04H 1/587* (2013.01); *D04H 1/64* (2013.01)

(58) Field of Classification Search
CPC .. C09J 105/00; C03C 25/321; C03C 25/1095; C08L 67/04; D04H 1/42; D04H 1/4218; D04H 1/64; D04H 1/587
See application file for complete search history.

(56) References Cited

U.S. PATENT DOCUMENTS

2007/0027283 A1    2/2007 Swift et al.
2017/0035955 A1 *  2/2017 Eliaz .................. A61M 1/3683

FOREIGN PATENT DOCUMENTS

| EP | 2841387 B1 | 11/2016 | |
|---|---|---|---|
| WO | WO-2008043960 A1 | 4/2008 | |
| WO | WO-2012076462 A1 * | 6/2012 | .............. B29D 7/01 |
| WO | WO-2013076198 A1 | 5/2013 | |
| WO | WO-2015159012 A1 | 10/2015 | |

OTHER PUBLICATIONS

English translation of an Office Action dated Mar. 1, 2022 in Indian Patent Application No. 202117026544, 5 pages.
English translation of an Office Action dated Oct. 11, 2023 in Colombian Patent Application No. NC2021/0010013, 7 pages.
International Search Report dated Apr. 20, 2020 in PCT/FR2020/050026 (with English translation), 4 pages.

* cited by examiner

*Primary Examiner* — C Melissa Koslow
(74) *Attorney, Agent, or Firm* — Element IP, PLC

(57) ABSTRACT

The present invention concerns a method for manufacturing an insulating product based on organic or mineral fibers, which comprises—applying an aqueous binder composition to organic or mineral fibers, preferably mineral wool fibers; —heating the fibers bonded with the aqueous binder composition so as to evaporate the volatile phase of the aqueous binder composition and to bring about the thermal curing of the non-volatile residue, or packaging the organic or mineral fibers bonded with the aqueous binder composition for the purpose of storage and/or transport, the aqueous binder composition having a pH of between 1.0 and 6.5, preferably between 1.5 and 5.0, and comprising: a) at least one carbohydrate selected from hydrogenated sugars, reducing sugars, non-reducing sugars and mixtures thereof, (b) at least one polycarboxylic acid or an anhydride of such an acid, (c) from 1 to 35% by weight, relative to the total weight of components (a), (b) and (c), of a water-soluble, amine-containing phenolic resin consisting essentially of phenol-formaldehyde condensates and phenol-formaldehyde-amine condensates.

20 Claims, No Drawings

METHOD FOR MANUFACTURING AN INSULATION PRODUCT BASED ON MINERAL WOOL

The present invention relates to a method for manufacturing an insulating product based on fibers, in particular based on mineral wool, using a binder composition containing a carbohydrate component, at least one polycarboxylic acid or anhydride, and an amine-containing phenolic resin, to which is water-soluble and stable in acid medium.

The manufacture of insulating products based on mineral wool generally comprises a step of manufacturing glass or rock fibers by a centrifugation method. On their path between the centrifugation device and the fiber collecting belt, an aqueous sizing composition, also referred to as binder, is sprayed onto the still-hot fibers, which binder then undergoes a thermosetting reaction at temperatures of approximately 200° C.

The phenolic resins which have been used for several decades as binders are being increasingly replaced by products originating from renewable sources and which do not emit, or only emit a very small amount of, formaldehyde, which is a compound considered to be harmful to human health.

Thus, it is known, for example from WO2009/0809038, to bind mineral fibers with aqueous sizing compositions devoid of formaldehyde containing, as thermally crosslinkable reagents, carbohydrates and polycarboxylic acids.

Application WO2007/014236 discloses aqueous binders devoid of formaldehyde, comprising Maillard reagents, namely reducing sugars and amine-containing compounds.

These sizing compositions based on reducing sugars have the disadvantage of giving rise to coloring reactions (caramelization, Maillard reaction), which make it difficult, or even impossible, to obtain light-colored products.

The Applicant proposed, in their applications WO2010/029266 and WO2013/014399 binders not based on reducing sugars but based on hydrogenated sugars, also referred to as sugar alcohols. These reagents have considerably greater thermal stability than reducing sugars and do not give rise to Maillard and/or caramelization reactions.

Binders devoid of formaldehyde containing both hydrogenated sugars and reducing or non-reducing sugars have been disclosed, respectively, in applications WO2013/021112 and WO2015/159012 in the Applicant's name.

Insulating products based on mineral wool and on binders based on carbohydrates (reducing sugars, non-reducing sugars, hydrogenated sugars) are nonetheless relatively hygroscopic and retain their mechanical properties less well over time than products manufactured with phenolic binders (resols), particularly at high humidities. In order to compensate for the loss of mechanical properties after a certain period of aging of these insulating products, it is generally necessary to increase the proportion of binder from approximately 10 to 20%, which not only increases the cost of the final product but also adversely affects its response to fire.

The Applicant proposed, in application WO2015/132518, to improve the aging resistance of mineral wool insulating products bonded by binders based on hydrogenated sugars, optionally in a mixture with reducing sugars, by incorporating relatively large amounts of epoxysilanes into the binder composition.

They also successfully used monoalcohols which are both hydrophobic and water-soluble, such as phenoxyethanol, to reduce the sensitivity to humidity of such insulating products (see WO2015/181458).

Nevertheless, the epoxysilanes and hydrophobic monoalcohols used in these binder compositions undesirably increase the cost thereof.

During their research with the aim of finding yet other solutions, particularly more economical solutions, for improving the mechanical to properties and aging resistance of insulating products based on fibers bonded by carbohydrate-based binders, the Applicant tested binder compositions containing small amounts of phenolic resins (resols). However, these tests did not bear fruit, since the customary phenolic resins, consisting of phenol/formaldehyde condensates (PF resins) or of phenol/formaldehyde and urea/formaldehyde condensates (PFU resins), proved to be unstable. Indeed, they react and precipitate rapidly, even at ambient temperature, when they are brought into contact with the aqueous binder compositions based on sugars and on polycarboxylic acids described in the introduction (WO2009/0809038, WO2010/029266, WO2013/014399, WO2013/021112, WO2015/159012, WO2015/132518, WO2015/181458). The Applicant has attributed this instability of the PF and PFU resins to the acid pH of the binder compositions.

The present invention is based on the discovery that a particular group of phenolic resins containing basic amine functions (which can be protonated) was stable in acid medium and therefore could be used with the aqueous binder compositions based on polycarboxylic acids and on sugars and/or on hydrogenated sugars of the prior art. These phenolic resins containing amine functions are known and the preparation thereof is described in detail in applications WO2008/043960 and WO2008/043961 by the Applicant.

The use of these amine-containing phenolic resins in acid binder compositions based on sugars and on polycarboxylic acids has made it possible to improve the mechanical properties of the insulating products obtained, including after aging in humid conditions, as long as certain amounts of phenolic resin are not exceeded.

As a result, the first object of the present application is a method for manufacturing an insulating product based on mineral or organic fibers, comprising
- applying an aqueous binder composition to mineral or organic fibers,
- heating the fibers coated with the aqueous binder composition so as to evaporate the volatile phase of the aqueous binder composition and to bring about the thermal curing of the non-volatile residue, or packaging the mineral or organic fibers coated with the aqueous binder composition for the purpose of storage and/or transport, the aqueous binder composition having a pH of between 1.0 and 6.5, preferably between 1.5 and 5.0, and comprising:
    - (a) at least one carbohydrate selected from hydrogenated sugars, reducing sugars, non-reducing sugars and mixtures thereof,
    - (b) at least one polycarboxylic acid or an anhydride of such an acid,
    - (c) from 1 to 35% by weight, relative to the total weight of the components (a), (b) and (c), of a water-soluble, amine-containing phenolic resin consisting essentially of phenol-formaldehyde condensates and phenol-formaldehyde-amine condensates.

Another object of the present application is an insulating product based on mineral or organic fibers obtained by such a method.

Finally, another object of the invention is an aqueous binder composition for the preparation of insulating products based on mineral or organic fibers, having a pH of between 1.0 and 6.5, preferably between 1.5 and 5.0, and comprising:
  (a) at least one carbohydrate selected from hydrogenated sugars, reducing sugars, non-reducing sugars and mixtures thereof,
  (b) at least one polycarboxylic acid or an anhydride of such an acid,
  (c) from 1 to 35% by weight, relative to the total weight of the components (a), (b) and (c), of a water-soluble, amine-containing phenolic resin consisting essentially of phenol-formaldehyde condensates and phenol-formaldehyde-amine condensates.

In the present application, the term "carbohydrate" has a broader meaning than usual, since it encompasses oses and osides having at least one aldehyde or ketone group (reducing group), non-reducing sugars consisting of several carbohydrate units, the carbons bearing the hemiacetal hydroxyl of which are involved in the osidic linkages linking the units to one another, and also hydrogenated sugars (also referred to as alditols or sugar alcohols) which are the hydrogenation products of oses or osides in which the aldehyde or ketone group has been reduced to an alcohol function.

The component (a) can in principle contain any carbohydrate selected from reducing sugars, non-reducing sugars and hydrogenated sugars and mixtures thereof.

The component (a) of the binder composition of the present invention advantageously comprises a certain fraction of hydrogenated sugars. This content in hydrogenated sugars of the carbohydrate (component (a)) is advantageously between 25 and 100% by weight, preferably at least equal to 30% by weight, in particular at least equal to 50% by weight, and ideally at least equal to 70% by weight, relative to the total weight of the carbohydrate component.

In a preferred embodiment, the component (a) consists solely of hydrogenated sugars and is devoid of reducing and non-reducing sugars. This embodiment is beneficial as it leads to insulating products which are particularly relatively colorless.

"Hydrogenated sugar" is intended to mean all the products resulting from the reduction of a saccharide selected from monosaccharides, disaccharides, oligosaccharides and polysaccharides, and mixtures of these products. Hydrogenated sugars are also referred to as sugar alcohols, alditols or polyols. They can be obtained by catalytic hydrogenation of saccharides. The hydrogenation can be carried out by known methods, working in conditions of high hydrogen pressure and high temperature, in the presence of a catalyst selected from elements of groups IB, IIB, IVB, VI, VII and VIII of the periodic table of the elements, preferably from the group comprising nickel, platinum, palladium, cobalt, molybdenum and mixtures thereof. The preferred catalyst is Raney nickel.

The hydrogenated sugar(s) are advantageously selected from the hydrogenation products of monosaccharides, disaccharides, oligosaccharides and mixtures thereof, preferably from the group consisting of erythritol, arabitol, xylitol, sorbitol, mannitol, iditol, maltitol, isomaltitol, lactitol, cellobitol, palatinitol, maltotritol, and the hydrogenation products of starch hydrolysates or hydrolysates of lignocellulosic materials, particularly of hemicellulose, in particular of xylans and xyloglucans.

Particularly preferably, use will be made of a hydrogenated sugar selected from the group consisting of maltitol, xylitol, sorbitol and the hydrogenation products of starch hydrolysates or lignocellulosic materials.

The reducing sugars are preferably selected from monosaccharides such as glucose, galactose, mannose and fructose, disaccharides such as lactose, maltose, isomaltose, cellobiose and mixtures thereof, and also hydrolysates of starch or of lignocellulosic materials described above. Use will preferably be made of glucose and fructose and mixtures thereof, in particular glucose.

Non-reducing sugars are preferably disaccharides such as trehalose, isotrehaloses, sucrose, isosucroses and mixtures thereof. Sucrose is particularly preferred.

The polycarboxylic acid(s) used in the present invention are preferably monomeric polycarboxylic acids. In other words, in a preferred embodiment of the present invention, this term does not cover polymers obtained by polymerization of monomeric polycarboxylic acids, such as homopolymers or copolymers of acrylic acid or of methacrylic acid.

Use will preferably be made of polycarboxylic acids selected from the group consisting of dicarboxylic acids, tricarboxylic acids and tetracarboxylic acids.

The dicarboxylic acids are for example selected from the group consisting of oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, particularly containing at least one boron or chlorine atom, tetrahydrophthalic acid and derivatives thereof, particularly containing at least one chlorine atom such as chlorendic acid, isophthalic acid, terephthalic acid, mesaconic acid and citraconic acid. The tricarboxylic acids are for example selected from the group formed of citric acid, tricarballylic acid, 1,2,4-butanetricarboxylic acid, aconitic acid, hemimellitic acid, trimellitic acid and trimesic acid. The tetracarboxylic acids are for example 1,2,3,4-butanetetracarboxylic acid and pyromellitic acid.

The particularly preferred polycarboxylic acid is citric acid.

The Applicant performed numerous tests to determine the respective proportions of the components (a) and (b) which lead to binders which, in the crosslinked state, provide the final product with the best mechanical properties, particularly after accelerated aging in humid conditions.

These tests showed that the carbohydrates/polycarboxylic acids weight ratio is advantageously between 25/75 and 75/25.

When the polycarboxylic acid is citric acid, this ratio is preferably between 25/75 and 55/45, in particular between 30/70 and 50/50.

In the technical field of phenol-formaldehyde resins, a distinction is mainly made between two families, namely:
  novolac resins prepared in acid medium, and
  resols obtained by basic catalysis.

The phenolic resins of the present invention belong to this second family.

Resol resins are obtained in basic medium by reaction of phenol with an excess of formaldehyde, the formaldehyde/phenol molar ratio typically being between 2 and 4, each molecule of phenol potentially being able to react with three molecules of formaldehyde.

Resol resins contain numerous methylol functions borne by an aromatic ring, which constitute sites for crosslinking by dehydrogenation/releasing formol. These resins substantially consists of phenol/formaldehyde (PF) condensates, residual phenol and residual formaldehyde. In acid medium they react, that is they polymerize, very rapidly at ambient temperature, and precipitate.

These resol-type resins consisting substantially of phenol/formaldehyde (PF) condensates and of residual phenol and formaldehyde may, after neutralization of the catalyst, be mixed with urea which mainly serves as a cosolvent, improving the dilutability of the resin and as scavenger for the residual formaldehyde. Such resols and the preparation thereof are described in application WO 01/96254. Nonetheless, the addition of urea described in this application does not substantially improve the stability at acid pH of the resols, and the resins described in this application cannot be used in the present application.

The amine-containing resols (component (c)) used in the present application are water-soluble resins which are stable at acid pH, even at very acid pH of between 1 and 2. This good stability is obtained by virtue of an additional reaction step which consists in reacting resol resins, substantially containing only phenol/formaldehyde condensates, phenol and formaldehyde, with an amine, preferably a monoalkanolamine, and in particular monoethanolamine.

This alkanolamine reacts according to the Mannich reaction with the phenol/formaldehyde (PF) condensates, the phenol and the formaldehyde to form phenol/formaldehyde/amine (PFA) condensates. At the end of the reaction, the reaction mixture can be acidified without this causing polymerization at ambient temperature. These resol resins are therefore considered to be stable in acid medium. The synthesis thereof is described in applications WO2008/043960 and WO2008/043961 from the Applicant. These resins are also distinguished by being virtually devoid of urea-formaldehyde condensates, which are only present in trace amounts. These urea-formaldehyde condensates are present in large amounts in numerous phenolic resins of the prior art and have insufficient thermal stability, releasing formaldehyde by thermal decomposition.

In a known way, it is possible to add, to the amine-containing resol resin, after reaction with the monoalkanolamine, cooling of the reaction mixture and acidification, up to 25% by weight, preferably between 10% and 20% by weight of urea, these amounts being expressed relative to the total dry weight of the amine-containing resol resin and urea. The urea mainly serves as cosolvent in this type of resin.

During tests aiming to develop insulating products based on predominantly bio-based ingredients which are more resistant to aging, the Applicant observed that it was important to use a relatively small fraction of amine-containing phenolic resin. The optimum mechanical properties were observed for fractions of amine-containing phenolic resin around 5 to 20% by weight relative to the total weight of components (a), (b) and (c).

The aqueous binder composition of the present invention consequently contains between 1 and 35% by weight, preferably from 2 to 30%, in particular from 5 to 27% by weight, and more preferentially from 7 to 20% by weight, relative to the total weight of components (a), (b) and (c), of water-soluble amine-containing phenolic resin consisting substantially of phenol-formaldehyde condensates and of phenol-formaldehyde-amine condensates.

These amounts are to be understood as being expressed as dry materials. Moreover, they do not include the weight of the urea or other additives optionally added to the mixture of the amine-containing phenolic resin and of (a) and (b).

The aqueous binder composition, at the moment it is applied to the mineral wool fibers, has a pH of between 1.0 and 6.5, preferably between 1.5 and 5.0. This pH is more preferentially between 1.5 and 4.0, or even between 1.7 and 3.0.

The aqueous binder composition of the present invention advantageously further contains between 0.5% and 10% by weight, preferably between 1.0% and 5% by weight, relative to the total weight of solid materials of the binder composition, of an esterification catalyst, preferably selected from the group consisting of sodium hypophosphite and hypophosphorous acid.

The binder composition may further comprise known additives in the following proportions, calculated based on 100 parts by weight of component (a)+(b)+(c):
 0 to 5 parts of silane, in particular an epoxysilane or aminosilane (coupling agent),
 0 to 40 parts, preferably 4 to 25 parts, of an oil or an oil emulsion (dust-preventing agent),
 0 to 5 parts of a silicone.

The binder composition is prepared by simply mixing the constituents (components (a), (b), (c), catalyst, urea and additives) with water.

At the moment of application to the fibers, the binder composition has a dry material content of between 2 and 15% by weight, preferably between 3 and 10% by weight.

It is applied in an amount such that the content of insoluble and infusible binder of the final product obtained after thermal curing is between 2% and 20% by weight, preferably between 3% and 15% by weight, in particular between 4 and 12% by weight.

When the insulating product is a product based on mineral wool, the binder composition is projected by spraying onto the mineral fibers at the centrifuge outlet and before the mineral fibers are collected on the receiving member in the form of a layer of fibers, which is then treated in an oven at a temperature effecting crosslinking of the reactive ingredients and resulting in an infusible binder. This crosslinking/thermal curing step is carried out by heating to a temperature of greater than or equal to 180° C., preferably of between 190° C. and 220° C., for a duration of between 20 seconds and 300 seconds, preferably between 30 and 250 seconds.

When the insulating product is a product based on organic fibers such as fibers of plant origin, for example cellulose fibers, or animal origin, such as wool, the curing temperature is generally lower than that used for curing products based on mineral fibers, in order to save the organic fibers from potential thermal degradation. The curing temperatures are for example to between 150 and 200° C. The curing duration is generally between several minutes and several tens of minutes, for example between 5 and 50 minutes, preferably between 10 and 30 minutes.

In the method of the present invention, the curing of the mineral or organic fibers may be carried out immediately after application of the binder composition to the fibers and collection of the bonded fibers on a conveyor belt, for example by passing into a temperature-controlled oven at the desired curing temperature.

The method of the present application also covers an embodiment in which the mat of bonded fibers is not immediately cured but is packaged, for example partially dried, cut, compressed, shaped and wrapped, with a view to a curing step separate from the step of manufacture of the mat of bonded fibers. The packaging material must be chosen so as to enable the storage and/or transport of these intermediate products (fibers bonded with an uncured binder) that are to be submitted to an additional method step, implemented later on or in a different location, and comprising the thermal curing of the binder, optionally after shaping the intermediate product, for example in a mold.

EXAMPLE

A composition 1 is prepared, containing 30% dry matter, containing 48 parts by weight of maltitol (component (a)), 52 parts by weight of citric acid (component (b)), and 5 parts by weight of sodium hypophosphite (catalyst).

A composition 2 is prepared, containing 30% dry matter, containing 80 parts of amine-containing resin (component (c)), 20 parts of urea (cosolvent) and 3 parts of ammonium sulfate (catalyst).

Compositions 1 and 2 are mixed in variable proportions so as to obtain different weight ratios of component (c) to the sum of components (a)+(b)+(c).

TABLE 1

| Test solution | Parts of component (c) | Parts of urea | Parts of component (a) + component (b) | (c)/(a) + (b) + (c) |
|---|---|---|---|---|
| Test 1 according to the invention | 8 | 2 | 90 | 8.2% |
| Test 2 according to the invention | 16 | 4 | 80 | 16.7% |
| Test 3 according to the invention | 24 | 6 | 70 | 25.5% |
| Test 4, comparative | 40 | 10 | 50 | 44.4% |
| Test 5, comparative | 0 | 0 | 100 | 0% |

The solutions of tests 1-5 are used to determine the crosslinking onset temperature (TR) of the binder by dynamic mechanical analysis (DMA). Moreover, the Young's modulus and the tensile breaking strength of woven fabrics of glass fibers bonded by the different cured binders are determined, before and after accelerated aging under humid conditions.

Dynamic Mechanical Analysis:

0.4 g of the test solutions 1-5 are deposited using a pipette on strips of Whatman glass fiber filters (grade GF/C, reference 1822-915) of 60×12 mm, superimposed in pairs. The dynamic mechanical analysis is carried out on a DMA apparatus, model Q800 from TA Instruments, fitted with a double recessed clamp. During each curing test, a temperature ramp with the following parameters is applied:

stress: 0.1% temperature gradient: 25° C. to 250° C. (4° C. per minute)

frequency: 1 Hz

The crosslinking onset temperature is defined as the temperature at the maximum of the tan delta loss factor. The measurement precision is ±5° C.

Determining Young's Modulus and Tensile Strength

Woven fabrics of glass fibers are impregnated by immersion in the test solutions 1-5, diluted beforehand to 20% dry matter, so as to deposit approximately 6% binder on the fibers. The impregnated woven fabrics are cured for 120 seconds in a fan oven temperature-controlled at 215° C.

For each test, the cured woven fabrics are cut into ten rectangular strips. Half the strips are subjected to an accelerated aging protocol under humid conditions (3 days at 35° C. and 95% relative humidity).

An Instron Series 5960 tensile testing system is used, with a pulling direction at an angle of 45° relative to the warp and weft direction.

The Young's modulus is measured before aging, and the tensile breaking strength of the binder seals is measured before and after accelerated aging. The results, averaged over 5 tests, are presented in Table 2 below.

TABLE 2

| Test | pH | TR (° C.) | Young's modulus (MPa) | Tensile strength (N) before aging | Tensile strength (N) after aging |
|---|---|---|---|---|---|
| 1 (invention) | 1.8 | 140 ± 5 | 5200 ± 315 | 125 ± 4 | 73 ± 3 |
| 2 (invention) | 1.9 | 138 ± 5 | 5280 ± 250 | 122 ± 4 | 72 ± 2 |
| 3 (invention) | 2.0 | n.d. | 5000 ± 900 | 113 ± 5 | 68 ± 2 |
| 4 (comparative) | 2.1 | 130 ± 5 | 5220 ± 130 | 95 ± 3 | 63 ± 2 |
| 5 (comparative) | 1.7 | 144 ± 5 | 5190 ± 190 | 116 ± 5 | 63 ± 4 |

It is observed that the three tests according to the invention (tests 1-3), using a mixed binder based on maltitol (component (a)), on citric acid to (component (b)) and on amine-containing phenolic resin (component (c)) in proportions such that component (c) represents approximately 8% to 25% by weight of the sum of the components (a), (b) and (c), have a better tensile breaking strength after accelerated aging than a binder based on maltitol and on citric acid alone (test 5) and than a binder containing more than 40% by weight of amine-containing phenolic resin (component (c)) (test 4).

The invention claimed is:

1. A method for manufacturing an insulating product based on mineral or organic fibers, the method comprising:
   applying an aqueous binder composition to mineral or organic fibers; and
   heating the mineral or organic fibers coated with the aqueous binder composition so as to evaporate a volatile phase of the aqueous binder composition and to thermally cure a non-volatile residue, or packaging the mineral or organic fibers coated with the aqueous binder composition for storage and/or transport,
   wherein the aqueous binder composition has a pH of between 1.0 and 6.57 and comprises:
   (a) at least one carbohydrate selected from the group consisting of a hydrogenated sugar, a reducing sugar, a non-reducing sugar, and mixtures thereof;
   (b) at least one polycarboxylic acid or an anhydride of a polycarboxylic acid; and
   (c) from 1 to 35% by weight, relative to a total weight of components (a), (b), and (c), of a water-soluble, amine-functional phenolic resin consisting essentially of phenol-formaldehyde condensates and phenol-formaldehyde-amine condensates.

2. The method according to claim 1, wherein the aqueous binder composition comprises from 2 to 30% by weight, relative to the total weight of components (a), (b) and (c), of the water-soluble amine-functional phenolic resin.

3. The method according to claim 1, wherein the aqueous binder composition comprises from 5 to 27% by weight, relative to the total weight of components (a), (b) and (c), of the water-soluble amine-functional phenolic resin.

4. The method according to claim 1, wherein the aqueous binder composition comprises from 7 to 20% by weight, relative to the total weight of components (a), (b) and (c), of the water-soluble amine-functional phenolic resin.

5. The method according to claim 1, wherein the phenol-formaldehyde-amine condensates are phenol-formaldehyde-monoalkanolamine condensates.

6. The method according to claim 1, wherein the aqueous binder composition comprises the polycarboxylic acid and the polycarboxylic acid is a monomeric polycarboxylic acid.

7. The method according to claim 1, wherein the aqueous binder composition comprises the polycarboxylic acid and the polycarboxylic acid is citric acid.

8. The method according to claim 1, wherein the aqueous binder composition comprises at least one hydrogenated sugar and the proportion of hydrogenated sugars in the carbohydrate (component (a)) is between 25 and 100% by weight.

9. The method according to claim 8, wherein the carbohydrate (component (a)) comprises at least 30% by weight of hydrogenated sugars.

10. The method according to claim 8, wherein the carbohydrate (component (a)) comprises at least 50% by weight of hydrogenated sugars.

11. The method according to claim 1, wherein the hydrogenated sugar is selected from the hydrogenation products of monosaccharides, disaccharides, oligosaccharides and mixtures thereof.

12. The method according to claim 1, wherein the hydrogenated sugar is selected from the group consisting of maltitol, xylitol, sorbitols, hydrogenation products of starch hydrolysates, and hydrogenation products of lignocellulosic materials.

13. The method according to claim 1, wherein a weight ratio of the carbohydrate(s) (component (a)) to the polycarboxylic acid ((component (b)) is between 25/75 and 75/25.

14. The method according to claim 1, wherein the aqueous binder composition has a pH of between 1.5 and 4.0.

15. The method according to claim 1, wherein the aqueous binder composition has a pH of between 1.7 and 3.0.

16. The method according to claim 1, wherein the aqueous binder composition further comprises between 0.5 and 10% by weight, relative to a total weight of solid materials of the aqueous binder composition, of an esterification catalyst.

17. The method according to claim 16, wherein the aqueous binder composition comprises between 1 and 5% by weight, relative to the total weight of solid materials of the aqueous binder composition, of the esterification catalyst, and wherein the esterification catalyst is at least one selected from the group consisting of sodium hypophosphite and hypophosporous acid.

18. The method according to claim 1, wherein the aqueous binder composition is applied to mineral fibers.

19. An insulating product based on mineral or organic fibers, obtained by the method according to claim 1.

20. An aqueous binder composition, having a pH of between 1.0 and 6.5 and comprising:
    (a) at least one carbohydrate selected from a hydrogenated sugar, a reducing sugar, a non-reducing sugar, and mixtures thereof
    (b) at least one polycarboxylic acid or an anhydride of such a polycarboxylic acid; and
    (c) from 1 to 35% by weight, relative to a total weight of the components (a), (b) and (c), of a water-soluble, amine-functional phenolic resin consisting essentially of phenol-formaldehyde condensates and phenol-formaldehyde-amine condensates.

\* \* \* \* \*